(12) United States Patent
Milton et al.

(10) Patent No.: US 11,277,399 B2
(45) Date of Patent: Mar. 15, 2022

(54) ONBOARDING AN UNAUTHENTICATED CLIENT DEVICE WITHIN A SECURE TUNNEL

(71) Applicant: Hewlett Packard Enterprise Development LP, Houston, TX (US)

(72) Inventors: Antoni Milton, Santa Clara, CA (US); Timothy Cappalli, Boston, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 112 days.

(21) Appl. No.: 16/399,301

(22) Filed: Apr. 30, 2019

(65) Prior Publication Data
US 2020/0351261 A1 Nov. 5, 2020

(51) Int. Cl.
*H04L 29/06* (2006.01)

(52) U.S. Cl.
CPC ........ *H04L 63/0823* (2013.01); *H04L 63/102* (2013.01); *H04L 63/166* (2013.01); *H04L 63/20* (2013.01)

(58) Field of Classification Search
CPC ............... H04L 63/0823; H04L 63/102; H04L 63/166; H04L 63/20
See application file for complete search history.

(56) References Cited

U.S. PATENT DOCUMENTS

| | | | |
|---|---|---|---|
| 8,392,712 B1 * | 3/2013 | Wilson | H04L 63/0823 713/175 |
| 9,532,286 B2 * | 12/2016 | Hiscock | H04W 36/14 |
| 10,880,944 B2 * | 12/2020 | Ganu | H04W 64/00 |
| 2018/0183806 A1 * | 6/2018 | Nambisan | H04L 41/0893 |
| 2019/0138994 A1 * | 5/2019 | Deegalla | G06Q 10/103 |

OTHER PUBLICATIONS

Pomak et al. (Enterprise WiFi Hotspot Authentication with Hybrid Encryption on NFC-Enabled Smartphones, IEEE 2018, pp. 247-250) (Year: 2018).*
Inverse (Network Devices Configuration Guide for PacketFence version 8.0.0, Apr. 2018, 195 pages) (Year: 2018).*
Babo "Generic and Parameterizable Service for Remote Configuration of Mobile Phones Using Near Field Communication", PhD Thesis, 2013, 94 pages (Year: 2013).*
Gebert et al. "Demonstrating a Personalized Secure-By-Default Bring Your Own Device Solution Based on SoftwareDefined Networking", 2016, 4 pages (Year: 2016).*

(Continued)

*Primary Examiner* — Oleg Korsak
(74) *Attorney, Agent, or Firm* — Hewlett Packard Enterprise Patent Department

(57) ABSTRACT

Example method includes: establishing a secure tunnel with an unauthenticated client device associated with a user of a restricted network; receiving user credentials associated with the user and transmitted from the unauthenticated client device within the secure tunnel; validating the received user credentials; and transmitting at least a client certificate and device configuration information to the unauthenticated client device within the secure tunnel such that the unauthenticated client device is able to access the restricted network after installing the client certificate and applying the device configurations based on the received device configuration information.

19 Claims, 7 Drawing Sheets

(56) References Cited

OTHER PUBLICATIONS

Lee et al. "Active Authentication Method using NFC", 2012, 17 pages (Year: 2012).*
Wikipedia, "IEEE 802.1X", Mar. 6, 2019, available online at <https://en.wikipedia.org/w/index.php?title=IEEE_802.1X&oldid=886546475>, 8 pages.
Wikipedia, "RADIUS", Feb. 16, 2019, available online at <https://en.wikipedia.org/w/index.php?title=RADIUS&oldid=883587399>, 17 pages.
Wikipedia, "Simple Certificate Enrollment Protocol", Apr. 15, 2019, available online at <https://en.wikipedia.org/w/index.php?title=Simple_Certificate_Enrollment_Protocol&oldid=892629786>, 2 pages.
Zhou et al., "Tunnel Extensible Authentication Protocol (TEAP) Version 1", RFC 7170, May 2014, available online at <https://tools.ietf.org/html/rfc7170>, 102 pages.

* cited by examiner

PROFILE
INFORMATION
400

VERSION 402: 1

TYPE 404: WIRELESS LAN

NAME 406: HPN-BYOD

CONTROL OPTIONS 410:

CONNECTION MODE 412: CONNECT AUTOMATICALLY

NETWORK BROADCAST 414: CONNECT ONLY IF THIS NETWORK IS BROADCASTING

AUTOSWITCH 416: DO NOT SWITCH TO OTHER NETWORKS

*FIG. 4A*

CONNECTIVITY
SETTINGS
420

| | |
|---|---|
| NUMBER OF SSID 422: | 1 |
| SSID NAME 424: | HPN-BYOD |
| NETWORK TYPE 426: | INFRASTRUCTURE |
| RADIO TYPE 428: | [ANY RADIO TYPE] |
| VENDOR EXTENSION 430: | NOT PRESENT |

*FIG. 4B*

SECURITY
SETTINGS
440

| | |
|---|---|
| AUTHENTICATION 445: | WPA2-ENTERPRISE |
| CIPHER 450: | CCMP |
| SECURITY KEY 455: | ABSENT |
| 801.X AUTHENTICATION 460: | ENABLED |
| EAP TYPE 465: | SMART CARD OR OTHER CERTIFICATE |
| 801.X AUTH CREDENTIAL 470: | USER CREDENTIAL |
| CREDENTIALS CONFIGURED 475: | NO |
| CACHE USER INFORMATION 480: | YES |

*FIG. 4C*

ONBOARDING AN UNAUTHENTICATED CLIENT DEVICE WITHIN A SECURE TUNNEL

BACKGROUND

Bring your own device (BYOD) refers to the policy of permitting employees to bring personally owned devices, e.g., laptops, tablets, smart phones, etc., to their workplace, and to use those devices to access privileged company information and applications. These devices are typically unmanaged and completely in the end user's control. BYOD onboarding generally refers to a process during which a BYOD client's access to the enterprise network is restricted until the BYOD client is provisioned and approved. Specifically, the BYOD client is redirected to a web page portal (also referred to as "captive portal") while all other enterprise network access is blocked for the BYOD client. The employee user of the BYOD client would need to input the user credential via the captive portal to pass the user authentication. Thereafter, the employee user of the BYOD client may download, install, and execute a client-side application that configures the BYOD client to support authentication mechanisms in compliance with IEEE 802.1X standards. In particular, the client-side application can receive specific configurations (e.g., service set identifier (SSID), security type, etc.) and an X.509 certificate from a trusted entity.

BRIEF DESCRIPTION OF THE DRAWINGS

The following detailed description references the drawings, wherein:

FIGS. 4A-4C illustrates example information transmitted from the security policy manager during the BYOD device onboarding process according to the present disclosure;

DETAILED DESCRIPTION

During a conventional BYOD device onboarding process, a BYOD client's access to the enterprise network is restricted until the BYOD client is approved. For example, a company may allow client devices associated with users in the role of employee to access a restricted enterprise network, whereas other client devices associated with users in the role of guests may only be able to assess open network without any access to the restricted enterprise network. Before the BYOD client is approved, the BYOD device associated with a user in the role of employee may only have access to the open network. To onboard the BYOD device to the enterprise network, the BYOD client is redirected to a captive portal while all other enterprise network access is blocked for the BYOD client. The employee user of the BYOD client would need to input the user credential via the captive portal to pass the user authentication. Thereafter, the employee user of the BYOD client may download, install, and execute a client-side application that configures the BYOD client to support certain authentication mechanisms, for example, those authentication mechanisms in compliance with IEEE 802.1X standards. In particular, the client-side application can receive specific configurations (e.g., service set identifier (SSID), security type, etc.) and an X.509 certificate from a trusted authority.

Figure 1:
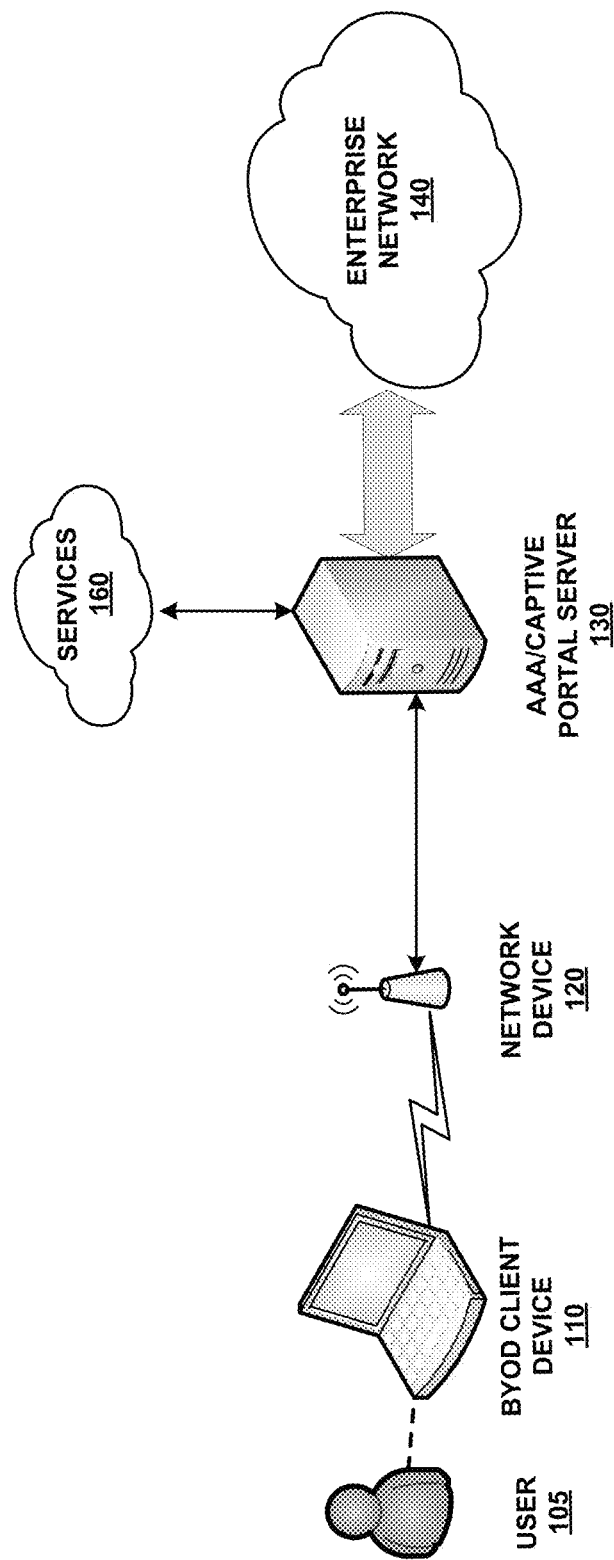
FIG. 1 illustrates an example network environment for client device onboarding in accordance with the present disclosure.

FIG. 1 illustrates an example network environment for client device onboarding. In this example, user 105 is an employee of an enterprise organization. Client device 110 represents a BYOD device that the user 105 intends to use for access to enterprise network, including various services 160 accessible to enterprise users. Network device 120 may be any network devices in the enterprise network infrastructure that allows a client device to connect to via wired and/or wireless connections, for example, an access point (AP), a wired switching, etc. In this example, assuming that client device 110 completes a wireless association process and establishes a wireless link with network device 120, which may be an AP. Thereafter, the client device 110 is redirected to a captive portal web page that is hosted at an Authentication, Authorization and Accounting (AAA)/captive portal server 130. The client device 110 will then need to pass an authentication process, which may be an IEEE 802.1X authentication, via the captive portal server 130. During the authentication process, the AAA/captive portal server 130 may receive credentials from client device 110 and communicate with an enterprise network 140. The enterprise network 140 can determine whether to approve the access to services 160 for client device 110 based on the provided credentials and the roles associated with the user 105 and/or client device 110.

Figure 2:
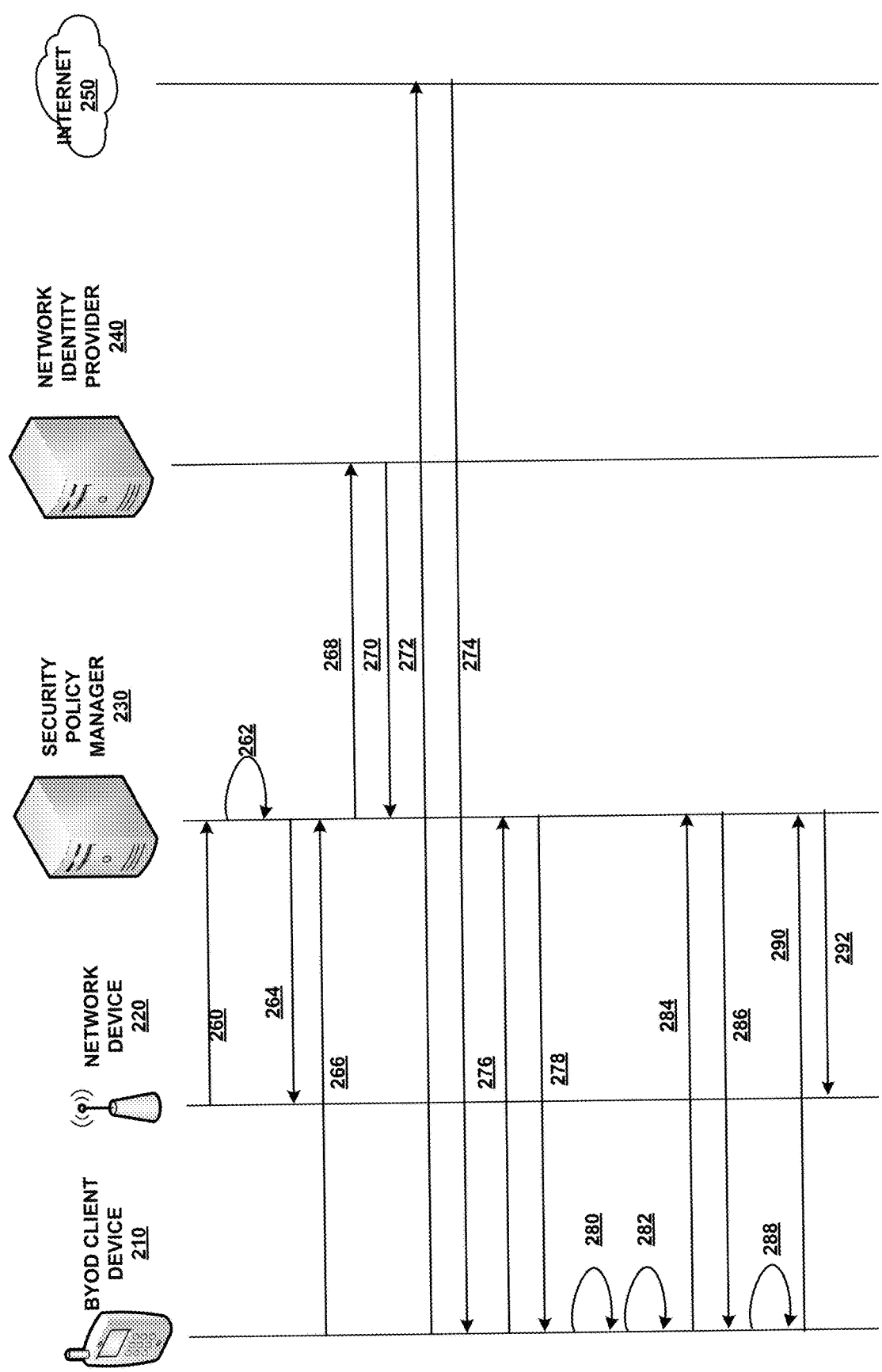
FIG. 2 is a sequence diagram illustrating example communications during a BYOD device onboarding process according to the present disclosure.

FIG. 2 is a sequence diagram illustrating example communications during a BYOD device onboarding process. FIG. 2 includes a BYOD client device 210, a network device 220, a security policy manager 230 which could be hosted on a NAS, a network identity provider 240, and Internet 250.

First, the BYOD client device 210 associates with a network device 220 in the enterprise network via an open service set identifier (SSID) and/or guest SSID. The open SSID and/or guest SSID uniquely identifies a network that does not include any proprietary or sensitive enterprise network resources. After the association completes, network device 220 can uses the media access control (MAC) identifier of the BYOD client device 210 to send a MAC authentication request 260 to the security policy manager 230. The security policy manager 230 may then determine whether the MAC identifier has been cached 262, e.g., recently rejected. If so, the security policy manager 230 will send an access rejection message 264 to network device 220. Hence, the BYOD client device 210 will be denied access to the restricted enterprise network.

Meanwhile, the user of the BYOD client device 210 can complete a web login process from step 266 to 288. Specifically, the user will be presented a captive portal web page, and the user can provide credentials, select onboard options, etc., via the captive portal page. The web traffic 266 in response to the captive portal page is then redirected to the security policy manager 230 from network device 220. Subsequently, the security policy manager 230 can verify if the user provided credentials are valid with the network identity provider 240 in an exchange of request 268 and response 270.

Then, the user will need to access Internet 250 and navigate to an application store on the BYOD client device 210. Specifically, the BYOD client device 210 can request a particular BYOD device client-side onboarding application in request 272, and download/install the particular BYOD device client-side onboarding application in response 274. After installing the client-side onboarding application, the BYOD client device 210 can send a message 276 to the security policy manager 230 to request device provisioning configurations, and download the device provisioning configurations in message 278 from the security policy manager 230. Then, the user can accept the permission prompts 280 in the client-side onboarding application, and initiate device provisioning 282. During device provisioning 282, the BYOD client device 210 can send message 284 to the security policy manager 230 to request a security certificate. The security policy manager 230 can transmit the security certificate to the BYOD client device 210 in message 286. Upon downloading the security certificate to the BYOD client device 210, the device can then complete supplicant provisioning 288 and disconnect with the captive portal.

Next, the BYOD client device 210 needs to use the client-side onboarding application to connect to an enterprise SSID using IEEE 802.1X authentication. For example, the BYOD client device 210 can send an authentication request 290. In one example, the authentication request 290 may be an Extensible Authentication Protocol-Transport Layer Security (EAP-TLS) authentication request. The network device 220 can pass the authentication request 290 to the security policy manager 230, which will complete a device authentication process, e.g., via a Remote Authentication Dial-in User Service (RADIUS) networking protocol, and send back an authentication accepted message 292 to the network device 220. Thereafter, the network device 220 will allow accessing requests to enterprise network resources from the BYOD client device 210.

The use of the client-side application during the above described onboarding process creates challenges due to various dependencies of the application. For example, in order to allow the user successfully download the client-side onboarding application to the BYOD client device, the captive portal would need to whitelist the application store in the open and/or guest network. By whitelisting the application store, the network administrator may inadvertently allowing access to certain applications in the application store that provide access to network resources that are not allowed in the open and/or guest network. Hence, additional measures would have to be taken to prevent the BYOD client device from either downloading those applications or accessing the disallowed resources using those applications. In addition, the client-side onboarding application is specific to each operating system platform. Thus, multiple flavors of the client-side onboarding application may have to be maintained, or a single client-side onboarding application supporting multiple OS platforms would need to be developed and updated accordingly when there is any update in any supported OS platforms.

Figure 3:
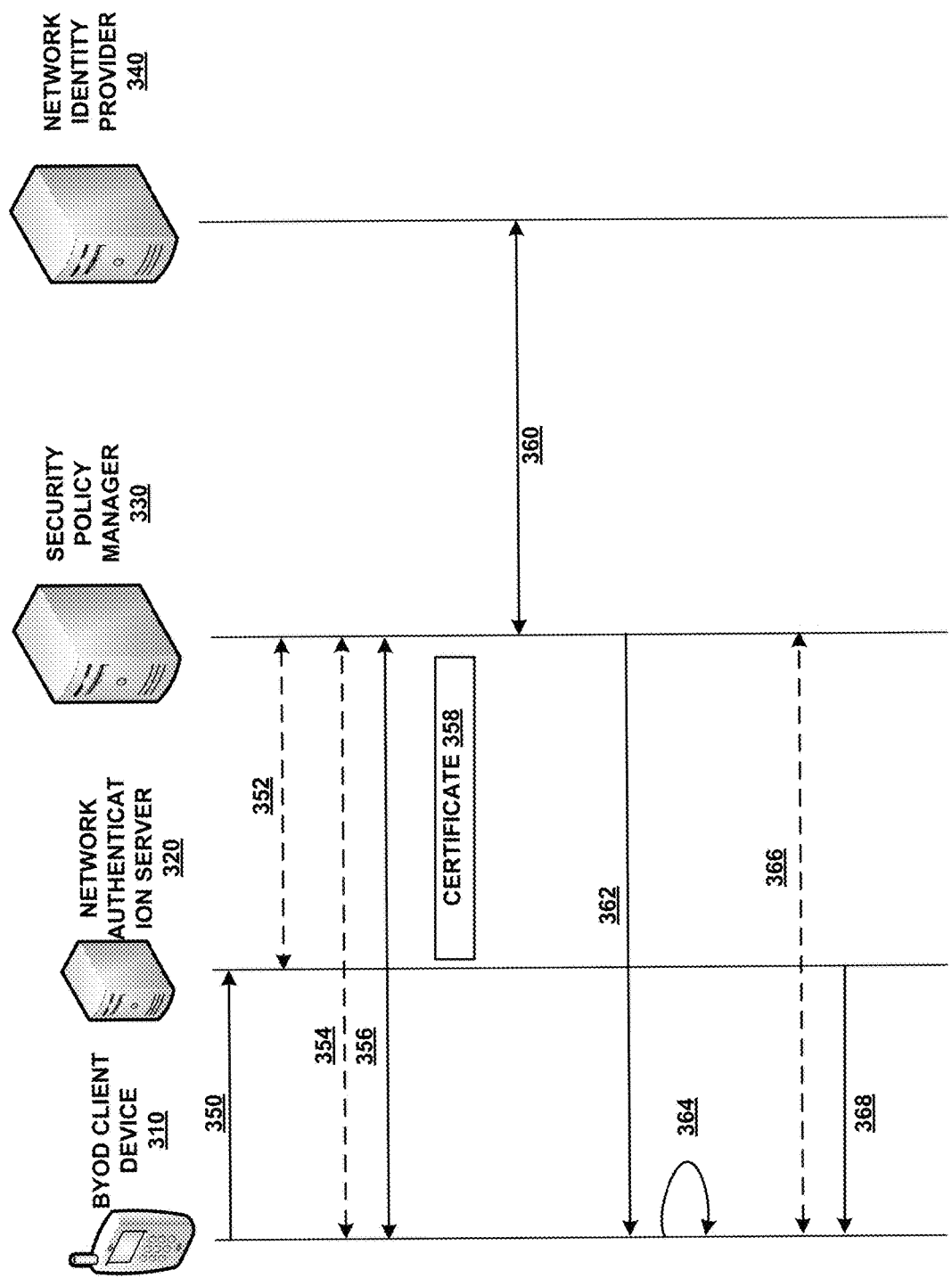
FIG. 3 is a sequence diagram illustrating example communications during an enhanced BYOD device onboarding process according to the present disclosure.

FIG. 3 is a sequence diagram illustrating example communications during an enhanced BYOD device onboarding process according to examples of the present disclosure. Specifically, FIG. 3 includes a client device 310 that could be a BYOD device (e.g., a laptop, a smart phone, and any other personal device), a network authentication server 320, a security policy manager 220, and a network identity provider 340. The network authentication server 320 can generally refer to any server that provides a network service that applications use to authenticate the credentials, e.g., account names and passwords, of their users. Network service may generally refer to any application running in a network that provides data storage, manipulation, presentation, communication or other capability which may be implemented using a client-server or peer-to-peer architecture based on application layer network protocols. The network authentication server 320 can be implemented in a network controller, a switch, or other similar network devices. The BYOD client device 310 is the supplicant of the security certificate. That is, the BYOD client device 310 needs to provide a valid security certificate issued by the network identity provider 340 in order to be onboard the restricted enterprise network.

One example authentication protocol that the network authentication server 320 can use is called Tunnel Extensible Authentication Protocol (TEAP). TEAP generally refers to a tunnel-based EAP method that enables secure communication between a peer and a server by using the Transport Layer Security (TLS) protocol to establish a mutually authenticated tunnel. Within the tunnel, TLV objects are used to convey authentication-related data between the EAP peer and the EAP server. Specifics of the TEAP are explained in RFC 7170 of Internet Engineering Task Force (IETF) (2014) and hereby incorporated in its entirety.

In some examples, multiple IEEE 802.1X authentication mechanisms may be used within the secure tunnel of TEAP. A first authentication mechanism may require a user of a BYOD client device to provide a valid user credential, such as a username and/or a password.

First, a supplicant, such as a BYOD client device 310 (e.g., a Windows laptop, an Android phone, or an iPhone), and a security policy manager 330 starts an EAP transaction 350 through the network authentication server 320. For example, the EAP transaction 350 may be an Extensible Authentication Protocol (EAP) over LAN (EAPoL) exchange. The EAPoL may refer to a network port authentication protocol used in IEEE 802.1X (Port Based Network Access Control) standard to give a generic network sign-on to access network resources. The EAPoL exchange can involve three parties, namely, a supplicant (e.g., the BYOD client device seeking access to network resources); an authenticator (e.g., the network authentication server that controls network access); and an authentication Server (e.g., a RADIUS/AAA server).

As such, the network authentication server 320 may exchange access requests and challenges for EAP 352 with the security policy manager 330. Then, a secure tunnel, such as an EAP-TLS tunnel, may be established 354 between the BYOD client device 310 and the security policy manager 330. Every packet transmitted within the secure tunnel is securely encrypted during the TEAP authentication. After establishing the secure tunnel (e.g., the EAP-TLS tunnel), the security policy manager 330 can request the supplicant (e.g., the BYOD client device 310) to provide EAP-based authentication information to validate the user of the BYOD client device 310. For example, supplicant (e.g., the BYOD client device 310) and the security policy manager 330 may complete a password-based authentication with EAP using MSCHAPv2 at 256.

If the EAP-based authentication succeeds, then the security policy manager 330 can generate a certificate 358 for device- and/or user-based user/device information. Also, the security policy manager 330 will update its local and/or external authentication or certificate sources with the user's and/or the device's information, including certificates. For example, the security policy manager 330 may update the network identity provider 340 with the generated certificate 350, along with other related user/device information in a message 360.

Subsequently, the security policy manager 330 can transmit a variety of information in a message 362, which includes but is not limited to, device certificate, user certificate, a server's root certificate authority (CA), a supplicant configuration (e.g., SSID, name, authentication type, etc.) inside the secure tunnel (e.g., the EAP-TLS tunnel). Note that message 362 includes a plurality of attributes specifically defined for this enhanced BYOD device onboarding process. Such attributes will be described in more details in the description of FIGS. 4A-4C later.

At 364, the supplicant (e.g., the BYOD client device 310) can update its trust store and/or security certificate store and configurations based on the information received from the security policy manager 330 in message 362. In some examples, based on configurations, the security policy manager 330 may send a Change of Authorization (CoA) message and/or a packet of disconnect (PoD) to trigger re-authentication as needed so that the supplicant may use the updated configurations. Later on, the supplicant can send device certificate and/or user certificate that it receives from the secure tunnel, e.g., during the EAP-TLS authentication, as updated in supplicant configurations.

The secure tunnel, such as the EAP-TLS tunnel, between the BYOD client device 310 and the security policy manager 330 is ended at 366. Note that every communication exchange from 354 to 366 between the supplicant/BYOD client device 310 and the security policy manager 330 occurs within the secure tunnel and is securely encrypted, so that other network devices (e.g., the network authentication server 320, switch, controller, and/or access points passing the packets) have no visibility of such messages. In addition, all of such messages are transmitted at layer 2 of the network where both the source and destination addresses of the messages are media access control (MAC) addresses. This allows the supplicant device to communicate via the secure tunnel without being assigned an IP address.

After the secure tunnel ends at 366, an EAP success message 368 is then transmitted from the network authentication server 320 to the BYOD client device 330, indicating the success of the device onboarding process. Thereafter, the BYOD client device 310 can access restricted enterprise network resources.

FIGS. 4A-4C illustrates example information transmitted from the security policy manager during the BYOD device onboarding process in accordance with the present disclosure. Specifically, FIG. 4A is example profile information 400 that may be transmitted from the security policy manager 330 to the BYOD client device 310 within the secure tunnel as illustrated in FIG. 3. The example profile information 400 may include a version 402 that indicates the version of the profile; a type 404 that indicates the type of the network (e.g., wireless LAN, LAN, etc.); a name 406 that indicates the SSID of the network, as well as a plurality of control options 410. The control options 410 may include, but are not limited to, a connection mode 412, a network broadcast setting 414, and an auto switch setting 416. In the example shown in FIG. 4A, the connection mode 412 is set for the BYOD device to connect to the network with the SSID "HPN-BYOD" automatically. The BYOD device will connect only if the network is broadcasting, and the BYOD device will not automatically switch to other networks once connected with the network identified as "HPN-BYOD." Note that FIG. 4A is provided for illustration purposes only. Other profile information may be included in the profile transmitted to the supplicant in the secure tunnel as well.

FIG. 4B is example connectivity settings 420 that may be transmitted from the security policy manager 330 to the BYOD client device 310 within the secure tunnel as illustrated in FIG. 3. The example connectivity settings 420 may include a number of SSID 422; a SSID name 424; a network type 426; a radio type 428; a vendor extension 430; etc. In the example connectivity setting illustrated in FIG. 4B, the network with SSID identified as "HPN-BYOD" advertises only 1 SSID, is an infrastructure type, and supports any radio types. Further, the vendor extension is not present. Note that FIG. 4B is provided for illustration purposes only. Other connectivity settings information may be included in the profile transmitted to the supplicant in the secure tunnel as well.

FIG. 4C is example security settings 440 that may be transmitted from the security policy manager 330 to the BYOD client device 310 within the secure tunnel as illustrated in FIG. 3. The example security settings 440 may include an authentication type 445; a cipher type 450; a security key 455; an 802.1X authentication option 460; an EAP type 465; a 802.1X authentication credential 470; an option 475 indicating whether the credentials are configured; an option 480 indicating whether user information should be cached; etc. In the example connectivity setting illustrated in FIG. 4C, the network uses WPA2-Enterprise for authentication and uses CCMP for encrypting and deciphering. The security key is absent. The 802.1X authentication is enabled. The EAP type is selected to be using a smart card or other certificate. The 802.1X authentication credential uses the user's credential, such as username and/or password. The credentials are not configured and the user information is cached. Note that FIG. 4C is provided for illustration purposes only. Other security settings information may be included in the profile transmitted to the supplicant in the secure tunnel as well. Furthermore, the profile can include other categories of device and/or network settings beside the profile information 400, connectivity settings 420, and security settings 440, all of which are to be transmitted in encrypted messages within the secure tunnel during the device onboarding process.

According to a conventional BYOD device onboarding process, a user will need to enter the user credentials, then an EAP authentication will occur. Upon successful EAP authentication based on the user credentials input, the security policy manager will redirect the request to a captive portal. During this process, the BYOD device is assigned a temporary IP address. However, the temporary IP address does not allow the BYOD device to access any network resources. All requests for accessing network resources will be automatically redirected to the captive portal. The temporary IP is assigned to the BYOD device so that it can communicate with the captive portal and download the onboarding application and subsequently the security certificates.

At the captive portal, the user will be prompted for the user credentials again. After the user enters valid user credentials at the captive portal, the BYOD device will be downloading a client-side onboarding application. After the client-side onboarding application is installed, the client-side onboarding application will then download a security certificate and/or device configuration information, for example, via a Hypertext Transfer Protocol Secure (HTTPS) protocol. The BYOD device will then need to restart before it can access the restricted enterprise network resources.

In summary, this enhanced BYOD device onboarding process eliminates the use of captive portal and provides better user experience because the user only needs to enter his/her username and password once. Also, the enhanced BYOD device onboarding process does not need a client-side onboarding application to be downloaded to the BYOD client device, which significantly reduces the administrative overhead of maintaining such applications.

Instead, all of the security certificate and device configuration information will be transmitted in the secure tunnel, such as the TEAP-TLS tunnel, in a single device enrollment process. Thus, the authenticator in an IEEE 802.1X transaction can push the certificates and configuration information to the supplicant prior to the supplicant device is assigned with an IP address in the network. The BYOD device was not assigned any temporary or interim status during this enhanced device onboarding process.

Figure 5:
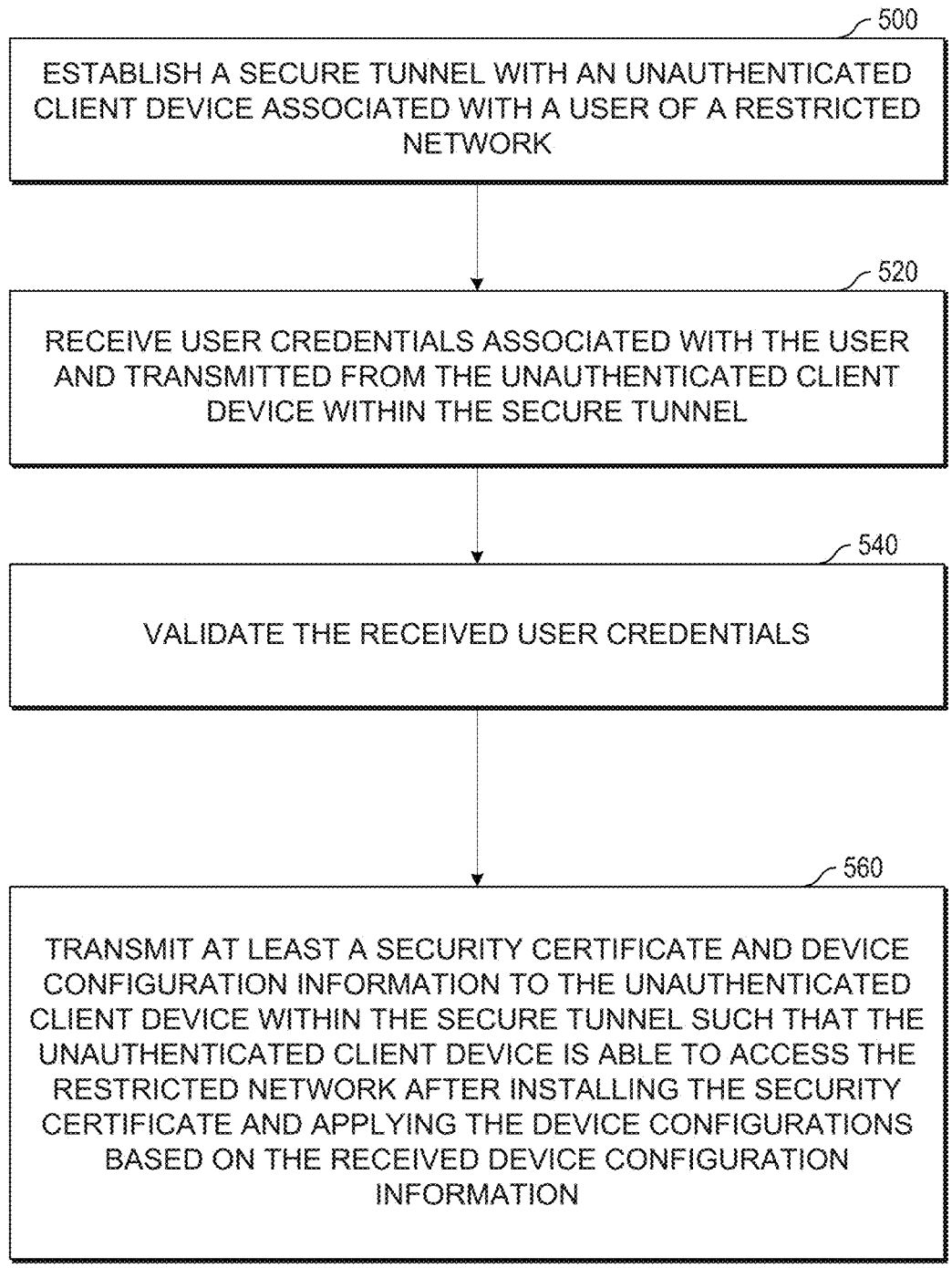
FIG. 5 is an example process of onboarding an unauthenticated client device within a secure tunnel according to the present disclosure.

FIG. 5 is an example process of onboarding an unauthenticated client device within a secure tunnel according to the present disclosure. During operations, a processor of a network device may establish a secure tunnel with an unauthenticated client device associated with a user of a restricted network (operation 500). Then, the network device may receive user credentials associated with the user and transmitted from the unauthenticated client device within the secure tunnel (operation 520). Next, the network device can validate the received user credentials (operation 540). Further, the network device can transmit at least a security certificate and device configuration information to the unauthenticated client device within the secure tunnel such that the unauthenticated client device is able to access the restricted network after installing the security certificate and applying the device configurations based on the received device configuration information.

In some examples, the secure tunnel can be an Extensible Authentication Protocol-Transport Layer Security (EAP-TLS) and/or a Protected Extensible Authentication Protocol (PEAP)-EAP-TLS.

In some examples, the security certificate is used to validate the user in an authentication process compliant with IEEE 802.1X standard. The security certificate may be one or more of: a device certificate and a user certificate.

In some examples, the device configuration information may include one or more of: profile information, connectivity setting information, and security setting information. The profile information may include a version; a type; a name; and a plurality of control options. The control options may include, but are not limited to, a connection mode, a network broadcast setting, and an auto switch setting. The connectivity settings information may include a number of SSID; a SSID name; a network type; a radio type; a vendor extension; etc. Moreover, the security settings information may include an authentication type; a cipher type; a security key; an 802.1X authentication option; an EAP type; a 802.1X authentication credential; a first option indicating whether the credentials are configured; a second option indicating whether user information should be cached; etc.

In some examples, the network device refrains from assigning a temporary Internet Protocol (IP) address to the unauthenticated client device, redirecting the unauthenticated client device to a captive portal, and facilitating the unauthenticated device to download a client-side onboarding application prior to transmitting the security certificate and the device configuration information to the unauthenticated client device within the secure tunnel.

In some examples, the network device can further transmit a re-authentication request such that the unauthenticated client device uses updated configurations based on the received device configuration information to complete its authentication to access the restricted network. The re-authentication request can be, for example, a Change of Authorization (CoA) message and/or a packet of disconnect (PoD) message.

In some examples, both authentication of the user and enrollment of the unauthenticated client device are completed in a single transaction within the secure tunnel.

Figure 6:
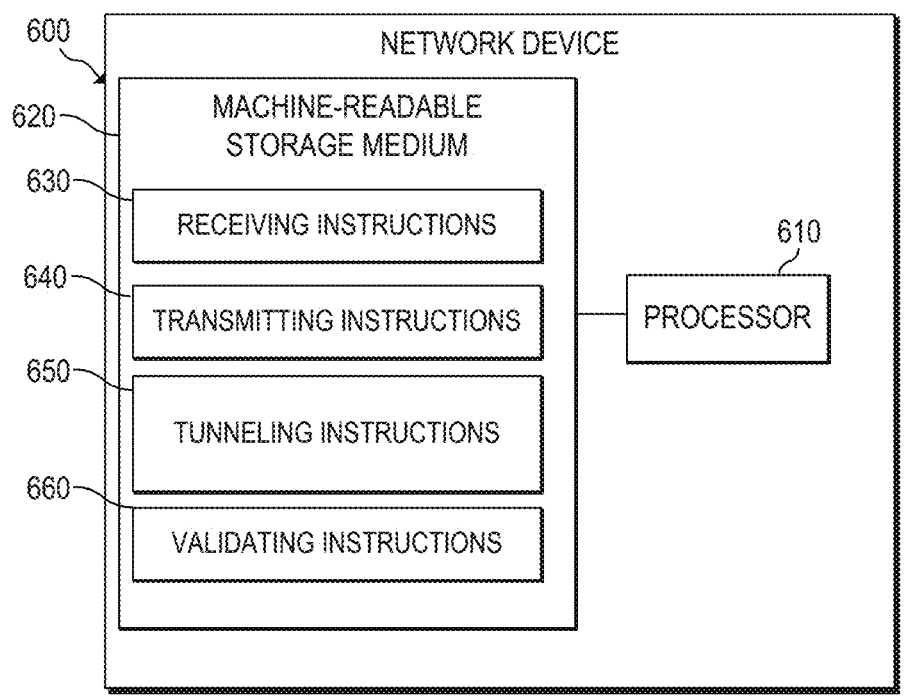
FIG. 6 is a block diagram of an example network device to onboard an unauthenticated client device within a secure tunnel according to the present disclosure.

FIG. 6 is a block diagram of an example network device to onboarding an unauthenticated client device within a secure tunnel according to the present disclosure. As used herein, a network device may be implemented, at least in part, by a combination of hardware and programming. For example, the hardware may comprise at least one processor (e.g., processor 610 which may include one main processor and a plurality of co-processors) and the programming may comprise instructions, executable by the processor(s), stored on at least one machine-readable storage medium (e.g., 620). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 610 may fetch, decode, and execute instructions stored on storage medium 620 to perform the functionalities described below in relation to receiving instructions 630, transmitting instructions 640, tunneling instructions 650, and validating instructions 660. In other examples, the functionalities of any of the instructions of storage medium 620 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 6, storage medium 620 may be implemented by one machine-readable storage medium, or multiple machine-readable storage media.

Although network device 600 includes at least one processor 610 and machine-readable storage medium 620, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 630-660 may be executed by processor 610 to: establish a secure tunnel with an unauthenticated client device associated with a user of a restricted network; receive user credentials associated with the user and transmitted from the unauthenticated client device within the secure tunnel; validate the received user credentials; transmit at least a security certificate and device configuration information to the unauthenticated client device within the secure tunnel such that the unauthenticated client device is able to access the restricted network after installing the security certificate and applying the device configurations based on the received device configuration information; transmit a re-authentication request within the secure tunnel such that the unauthenticated client device uses updated configurations based on the received device configuration information to complete its authentication to access the restricted network; etc.

We claim:

1. A method comprising:
   establishing, by a network device, a secure tunnel with an unauthenticated client device associated with a user of a restricted network, wherein messages transmitted via the secure tunnel are transmitted at Layer 2 where both source and destination addresses of the messages are media access control (MAC) addresses;
   refraining, by the network device, from assigning a temporary Internet Protocol (IP) address to the unauthenticated client device;
   prior to transmitting a security certificate and device configuration information to the unauthenticated client device within the secure tunnel, facilitating the unauthenticated client device to download a client-side onboarding application;
   receiving, by the network device, user credentials associated with the user and transmitted from the unauthenticated client device within the secure tunnel;
   validating, by the network device, the received user credentials; and
   transmitting, by the network device, the security certificate and device configuration information to the unauthenticated client device within the secure tunnel such that the unauthenticated client device is able to access the restricted network after installing the security certificate and applying the device configurations based on the received device configuration information.

2. The method of claim 1, wherein the secure tunnel comprises at least one of an Extensible Authentication Protocol-Transport Layer Security (EAP-TLS) and a Protected Extensible Authentication Protocol (PEAP)-EAP-TLS.

3. The method of claim 1, wherein the security certificate is used to validate the user in an authentication process compliant with IEEE 802.1X standard.

4. The method of claim 1, wherein the security certificate comprises one or more of: a device certificate and a user certificate.

5. The method of claim 1, wherein the device configuration information comprises one or more of: profile information, connectivity setting information, and security setting information.

6. The method of claim 1, further comprising:
   redirecting, by the network device, the unauthenticated client device to a captive portal, wherein the client-side onboarding application is transmitted via the captive portal while all other enterprise network access is blocked for the unauthenticated client device.

7. The method of claim 1, further comprising:
   transmitting, by the network device, a re-authentication request such that the unauthenticated client device uses updated configurations based on the received device configuration information to complete its authentication to access the restricted network.

8. The method of claim 7, wherein the re-authentication request comprises at least one of a Change of Authorization (CoA) message and a packet of disconnect (PoD) message.

9. The method of claim 1, wherein both authentication of the user and enrollment of the unauthenticated client device are completed in a single transaction within the secure tunnel.

10. The method of claim 1, wherein the client-side onboarding application configures the unauthenticated client device to support additional authentication mechanisms on the unauthenticated client device.

11. A network device comprising at least:
   a memory;
   a processor executing instructions in the memory to:
      establish a secure tunnel with an unauthenticated client device associated with a user of a restricted network, wherein messages transmitted via the secure tunnel are transmitted at Layer 2 where both source and destination addresses of the messages are media access control (MAC) addresses;
      refrain from assigning a temporary Internet Protocol (IP) address to the unauthenticated client device;
      prior to transmitting a security certificate and device configuration information to the unauthenticated client device within the secure tunnel, facilitate the unauthenticated client device to download a client-side onboarding application;
      receive user credentials associated with the user and transmitted from the unauthenticated client device within the secure tunnel;
      validate the received user credentials; and
      transmit at least a security certificate and device configuration information to the unauthenticated client device within the secure tunnel such that the unauthenticated client device is able to access the restricted network after installing the security certificate and applying the device configurations based on the received device configuration information.

12. The network device of claim 11, wherein the secure tunnel comprises at least one of an Extensible Authentication Protocol-Transport Layer Security (EAP-TLS) and a Protected Extensible Authentication Protocol (PEAP)-EAP-TLS.

13. The network device of claim 11, wherein the security certificate is used to validate the user in an authentication process compliant with IEEE 802.1X standard.

14. The network device of claim 11, wherein the security certificate comprises one or more of: a device certificate and a user certificate.

15. The network device of claim 11, wherein the device configuration information comprises one or more of: profile information, connectivity setting information, and security setting information.

16. The network device of claim 11, wherein the processor further executes the instructions in the memory to:
   transmit a re-authentication request such that the unauthenticated client device uses updated configurations based on the received device configuration information to complete its authentication to access the restricted network.

17. The network device of claim 16, wherein the re-authentication request comprises at least one of a Change of Authorization (CoA) message and a packet of disconnect (PoD) message.

18. The network device of claim 16, wherein both authentication of the user and enrollment of the unauthenticated client device are completed in a single transaction within the secure tunnel.

19. A non-transitory machine-readable storage medium encoded with instructions executable by a processor of a computing device, the non-transitory machine-readable storage medium comprising instructions to:

establish a secure tunnel with an unauthenticated client device associated with a user of a restricted network, wherein messages transmitted via the secure tunnel are transmitted at Layer 2 where both source and destination addresses of the messages are media access control (MAC) addresses;

refrain from assigning a temporary Internet Protocol (IP) address to the unauthenticated client device;

prior to transmitting a security certificate and device configuration information to the unauthenticated client device within the secure tunnel, facilitate the unauthenticated client device to download a client-side onboarding application;

receive user credentials associated with the user and transmitted from the unauthenticated client device within the secure tunnel;

validate the received user credentials; and transmit at least a security certificate and device configuration information to the unauthenticated client device within the secure tunnel such that the unauthenticated client device is able to access the restricted network after installing the security certificate and applying the device configurations based on the received device configuration information.

\* \* \* \* \*